(12) United States Patent
Hadderman et al.

(10) Patent No.: US 6,499,071 B1
(45) Date of Patent: Dec. 24, 2002

(54) INTERCONNECTION SYSTEM

(75) Inventors: Scott J. Hadderman, Pleasant Valley, NY (US); William F. Relyea, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/353,244

(22) Filed: Jul. 14, 1999

(51) Int. Cl.[7] .............................. G06F 13/00; H05K 7/10
(52) U.S. Cl. ....................... 710/100; 710/104; 710/301; 710/302; 710/303
(58) Field of Search ................................ 710/300, 303, 710/104, 305, 306, 100, 301, 302

(56) References Cited

U.S. PATENT DOCUMENTS

| | | | | |
|---|---|---|---|---|
| 5,272,584 A | * | 12/1993 | Austruy et al. | 361/58 |
| 5,558,577 A | | 9/1996 | Kato | |
| 5,568,610 A | * | 10/1996 | Brown | 714/48 |
| 5,862,393 A | * | 1/1999 | Davis | 713/323 |
| 6,274,949 B1 | * | 8/2001 | Lioux et al. | 307/64 |

OTHER PUBLICATIONS

Structured Computer Organization 3rd Edition 1990 by Andrew S. Tanenbaum.*

* cited by examiner

Primary Examiner—Peter Wong
Assistant Examiner—Tim Vo
(74) Attorney, Agent, or Firm—William A. Kinnaman; Cantor Colburn LLP

(57) ABSTRACT

An exemplary embodiment of the invention is an interconnection system including a primary connector having a first detection contact coupled to a first voltage, a second detection contact coupled to said first voltage and a reference contact coupled to a second voltage. The interconnection system includes a secondary connector having a first contact, a second contact and a secondary reference contact. The second contact and secondary reference contact are electrically connected. The first contact makes electrical connection with the first detection contact, the second contact makes electrical connection with the second detection contact and the secondary reference contact makes electrical connection with the reference contact. When the second detection contact makes electrical connection with the second contact, the second detection contact is connected to the second voltage.

16 Claims, 3 Drawing Sheets

INTERCONNECTION SYSTEM

BACKGROUND OF THE INVENTION

In existing computing systems, the ability to upgrade or to have flexibility in system configurations is critical. By design, these systems have modular components which allow many variations in combinations and numbers of subsystems. In order for the system to function as a complete unit, the system controller or processor should be able to recognize and distinguish between the individual subsystems. One way to accomplish this recognition is to inform the controller manually. In this case, the user would have to inform the system of what subsystems were present and give each subsystem an identification. This is tedious for the user and is prone to mistakes. Also, it has to be repeated every time the system configuration changes.

A second method is to give the system a way to identify each subsystem automatically. This usually involves some sort of presence detection using one or more electrical connections which distinguish between subsystems. A common example is 72 pin DRAM SIMMs. These parts typically have four presence detect signals which inform the system of the type and speed of memory which is installed. This sort of presence detect scheme works well when each subsystem has its own, dedicated set of detect circuits. The system can check each of these individual circuits for the presence of a subsystem. This method does not work, however, when these circuits are bussed together. In this case, a more sophisticated method is required.

When several subsystems are bussed together, each subsystem typically needs unique identifiers or addresses which the controller can use to distinguish between subsystems. To make the subsystems unique, the user may have to set jumpers or switches on the subsystems to configure them for proper operation. A problem arises, however, if the design requires no user intervention and that the subsystems be identical, i.e., the subsystem has no inherent unique identifier.

SUMMARY OF THE INVENTION

The above-discussed and other drawbacks and deficiencies of the prior art are overcome or alleviated by the interconnection system of the present invention. An exemplary embodiment of the invention is an interconnection system including a primary connector having a first detection contact coupled to a first voltage, a second detection contact coupled to said first voltage and a reference contact coupled to a second voltage. The interconnection system includes a secondary connector having a first contact, a second contact and a secondary reference contact. The second contact and secondary reference contact are electrically connected. The first contact makes electrical connection with the first detection contact, the second contact makes electrical connection with the second detection contact and the secondary reference contact makes electrical connection with the reference contact. When the second detection contact makes electrical connection with the second contact, the second detection contact is connected to the second voltage.

DETAILED DESCRIPTION

Figure 1:
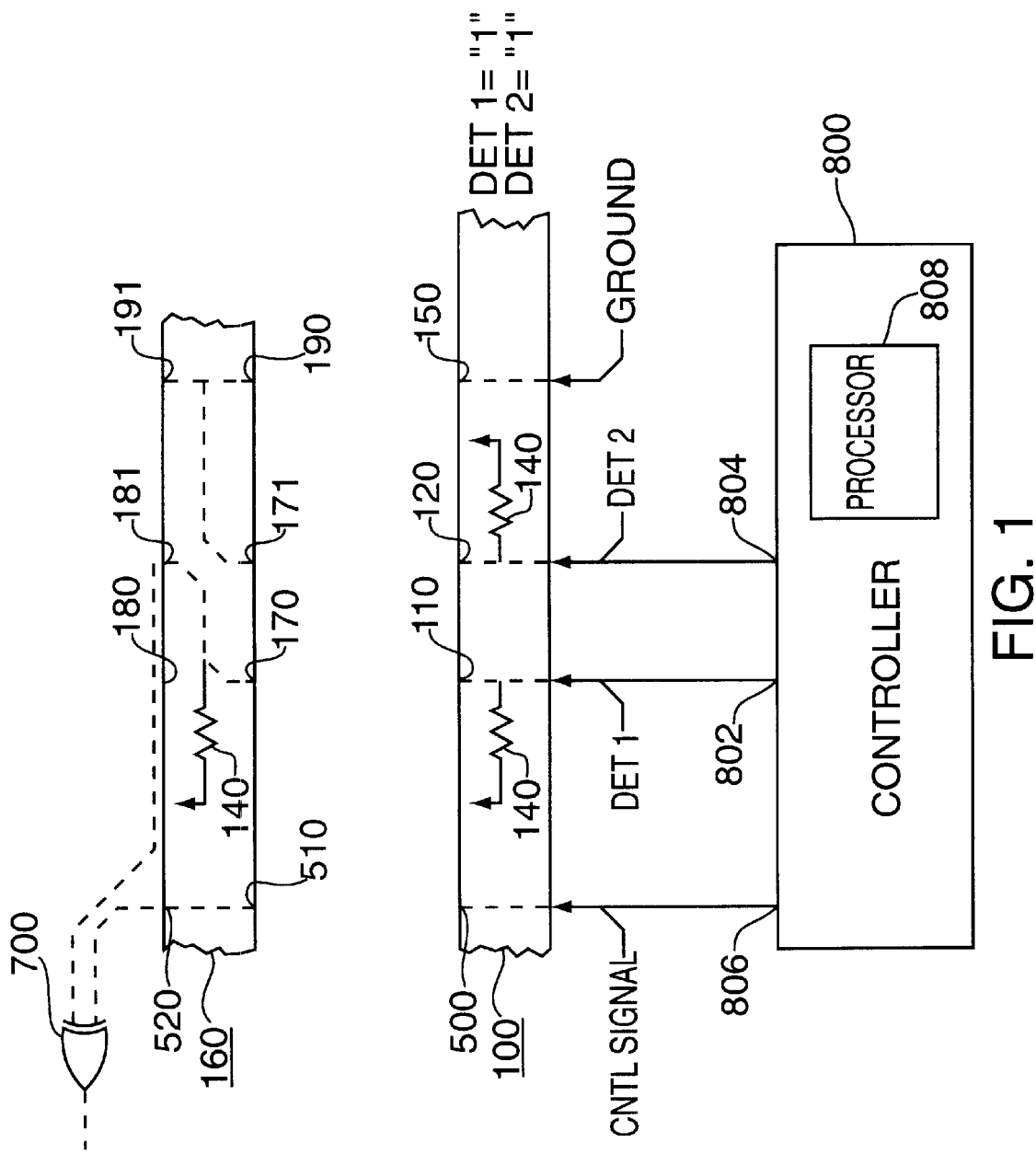
FIG. 1 depicts a controller, a primary connector and a secondary connector in an exemplary embodiment.

An exemplary embodiment of the invention is shown in FIG. 1. FIG. 1 depicts a primary connector 100 and a secondary connector 160. The primary connector 100 and secondary connector 160 may be circuit boards, but the invention is not limited to printed circuit board implementations. The primary connector 100 may correspond to a system (e.g., a memory controller) and secondary connector 160 may correspond to a sub-system (e.g., a memory device). The invention, however, is not limited to systems and subsystems and is applicable to a variety of devices. Also shown in FIG. 1 is a controller 800 connected to the primary connector 100.

In FIG. 1, the secondary connector 160 is not mated with the primary connector 100. The primary connector 100 contains a first detection contact 110 and a second detection contact 120. Each of these contacts is coupled to at first voltage level (e.g., 5 volts) by a separate resistor 140 connected to a voltage source. A ground path is also provided at ground contact 150 which is connected to ground. A control contact 500 is provided for receiving a control signal from controller 800 and addressing secondary connectors as described herein.

The primary connector 100 mates with a secondary connector 160. The secondary connector 160 includes a first contact 170 which makes electrical contact with first detection contact 110 on primary connector 100 and a second contact 171 which makes electrical contact with second detection contact 120 on primary connector 100. The secondary connector 160 includes ground contact 190 for making electrical contact with ground contact 150. Second contact 171 is electrically connected to ground contact 190. First contact 170 is coupled to at first voltage level (e.g., 5 volts) by a resistor 140 connected to a voltage source. A control contact 510 is also provided for making electrical contact with control contact 500.

The secondary connector 160 may receive a further secondary connector 160' (shown in FIG. 3), identical to secondary connector 160, at contacts 520, 180, 181 and 191. Contact 520 is electrically connected to contact 510. Contact 180 is floating. Contact 181 is electrically connected to first contact 170 and contact 191 is connected to ground contact 190. Detection of the presence of a secondary connector 160 at primary connector 100 will now be described. When no secondary connectors 160 are mated with primary connector 100, no connections are made to first detection contact 110 or second detection contact 120. Due to the internal pull up resistors 140 on the primary connector 100, the first detection contact 110 and second detection contact 120 are both at the first voltage level. By monitoring detection contacts 110 and 120 and sensing the first voltage level on both pins (shown as level 1 in FIG. 1), controller 800 connected to primary connector 100 can determine that no secondary connectors 160 are mated with primary connector 100.

Figure 2:
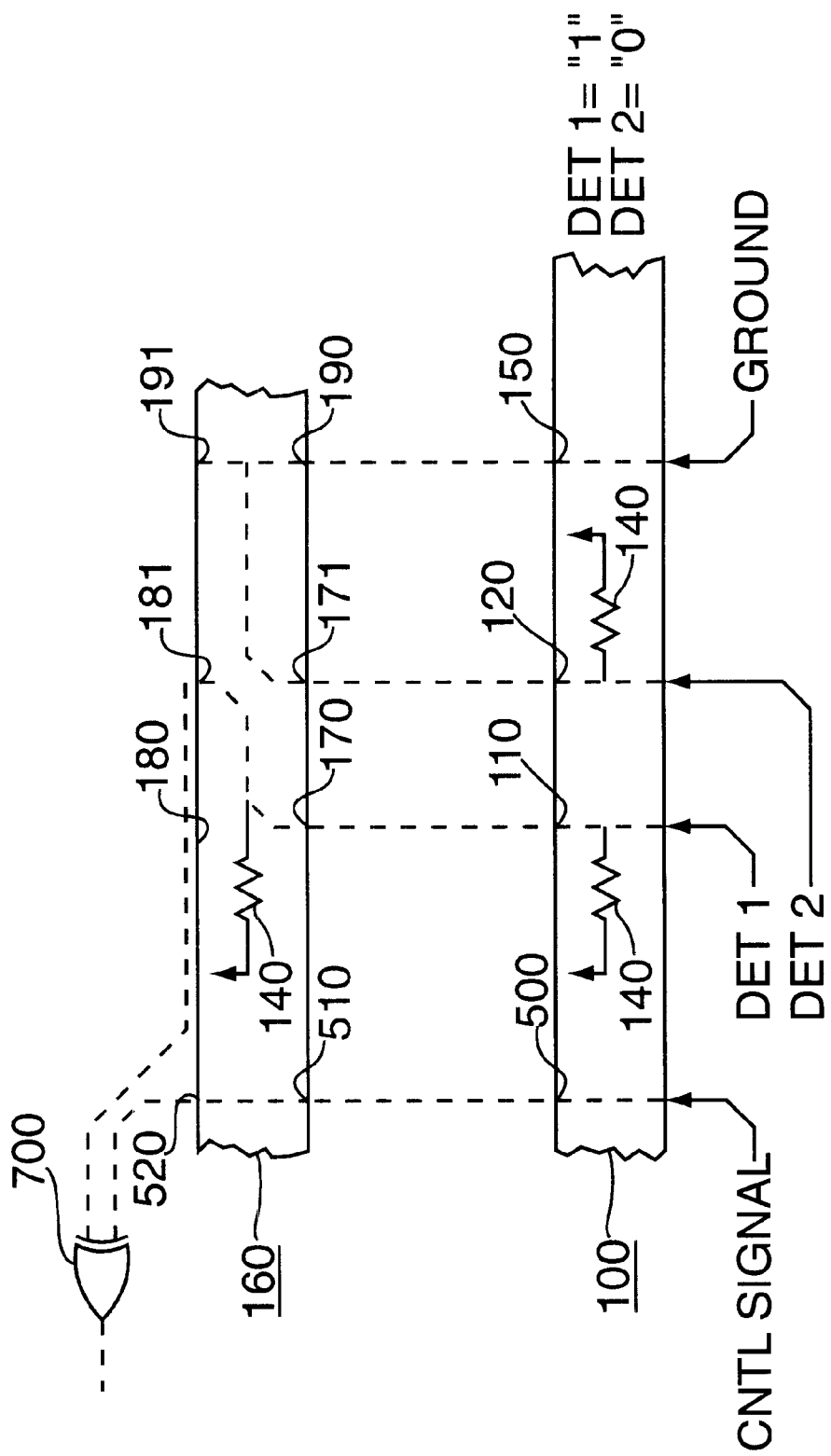
FIG. 2 depicts the primary connector and second connector mated.

FIG. 2 shows the connections when secondary connector 160 is mated with primary connector 100. When a single secondary connector 160 is connected to primary connector 100, first contact 170 makes electrical contact with first detection contact 110, second contact 171 makes electrical contact with second detection contact 120, ground contact 190 makes electrical contact with ground contact 150 and control contact 510 makes electrical contact with control contact 500. The electrical connection between ground contact 190 and second contact 171 causes second detection contact 120 to be connected to ground. First detection contact 110 remains at the first voltage level. Controller 800 (FIG. 1) monitoring detection contacts 110 and 120 will detect first detection contact 110 at the first voltage level (e.g., 1) and second detection contact 120 at ground (e.g., 0) indicating that a single secondary connector 160 is mated to primary connector 100.

Figure 3:
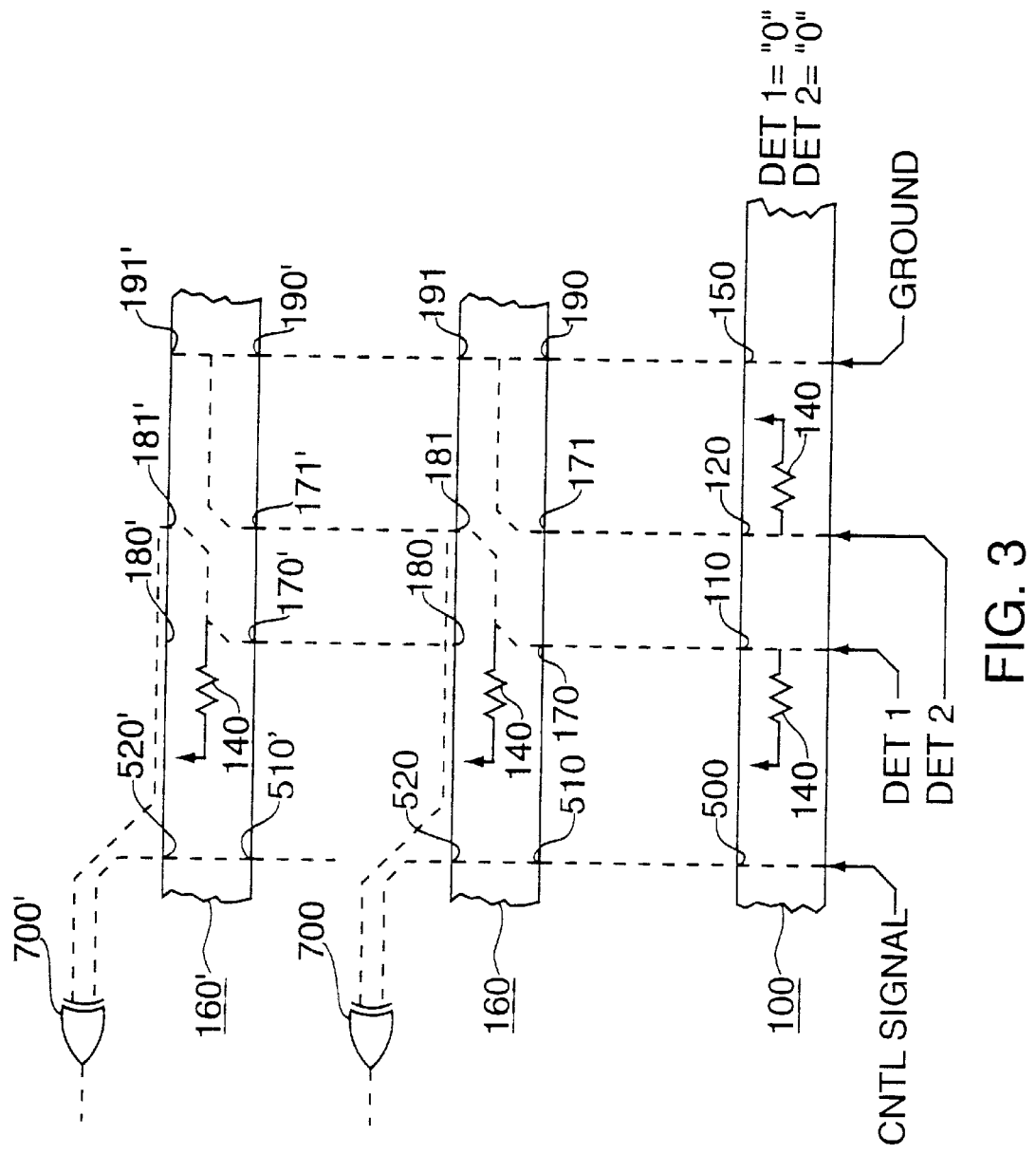
FIG. 3 depicts a primary connector, secondary connector, and further secondary connector mated.

FIG. 3 depicts an additional secondary connector 160' mated to secondary connector 160. The additional secondary connector 160' is identical to secondary connector 160 and includes similar contacts and internal connections. When the additional secondary connector 160' is mated to secondary connector 160, several additional electrical connections are made. Control contact 510' makes electrical contact with control contact 520, further first contact 170' makes electrical contact with contact 180, further second contact 171' makes electrical contact with contact 181 and ground contact 190' makes electrical contact with ground contact 191. Ground contact 190' is connected to ground through ground contact 191, ground contact 190 and ground contact 150. Ground contact 190' is also connected to further second contact 171' which mates with contact 181. As described above, contact 181 is connected to first contact 170 which mates with first detection contact 110. This causes first detection contact 110 to be connected to ground. Second detection contact 120 is connected to ground through secondary connector 160. Accordingly, the controller 800 monitoring detection contacts 110 and 120 detects a logic low (e.g., 0) on both first detection contact 110 and second detection contact 120. This indicates that a secondary connector 160 and an additional secondary connector 160' are connected to primary connector 100. The invention is not limited to detection of only two secondary connectors but can be expanded to provide for detection of any number of secondary connectors.

The exemplary embodiment shown in FIGS. 1–3 also allows the controller 800 to address multiple secondary connectors without the need for unique identifiers. Through the control signal applied to control contact 500, the controller 800 may select either secondary connector 160 or secondary connector 160'. Control input 510 is connected to a control circuit 700. The control circuit 700 is also connected to first contact 170 though contact 181. Control circuit 700' is similarly configured. The control circuit 700 implements an exclusive or operation between the control signal and value at contact 170. The output of the exclusive or operation is used as a select signal to select either secondary connector 160 or secondary connector 160'.

When both secondary connector 160 and secondary connector 160' are mated to primary connector 100, first contact 170 in secondary connector 160 will be grounded or low. Further first contact 170' of secondary connector 160' will be at the first voltage or high. If the control signal is high, the output of control circuit 700 will be high indicating selection of the secondary connector 160. The output of control circuit 700' will be low indicating that secondary connector 160' is not selected. In the opposite case, if the control signal is low, the output of control circuit 700 will be low indicating that the secondary connector 160 is not selected. The output of control circuit 700' will be high indicating selection of the secondary connector 160'. In this manner, the controller 800 interfacing with primary connector 100 can manipulate the state of the control signal to select either secondary connector 160 or secondary connector 160'.

The controller 800 connected to primary connector 100 detects the number of secondary connectors 160 mated with the primary connector 100 and addresses specific secondary connectors. The controller 800 may be a variety of devices including a memory controller. Controller 800 includes a first detection port 802 connected to first detection contact 110 and a second detection port 804 connected to second detection contact 120. To detect the number of secondary connectors 160, a processor 808 monitors the signals at detection ports 802 and 804. As described above, the signals at detection contacts 110 and 120 indicate the number of secondary connectors 160 mated to primary connector 100. Processor 808 detects a first signal at first detection port 802 and a second signal at second detection port 804 to determine the number of secondary connectors 160 mated to primary connector 100. It is understood that additional detection ports may be utilized on the controller 800 to expand the system to additional secondary connectors 160. The controller 800 also includes a control port 806 connected to control contact 500 in primary connector 100. As described above, the processor 808 can address a specific secondary connector by producing a control signal at control port 806. The processor 808 may generate multi-bit words at control port 806 to address a plurality of secondary connectors.

The above-described exemplary embodiments of the invention allow a controller to automatically identify and address individual secondary connectors (e.g., subsystems) in the system without a requirement that the individual secondary connectors be uniquely identified. This eliminates the need for user intervention and allows the use of multiple identical secondary connectors which reduces the number of unique parts.

While preferred embodiments have been shown and described, various modifications and substitutions may be made thereto without departing from the spirit and scope of the invention. Accordingly, it is to be understood that the present invention has been described by way of illustration and not limitation.

What is claimed is:
1. An interconnection system comprising:
  a primary connector having a first detection contact coupled to a first voltage, a second detection contact coupled to said first voltage and a reference contact coupled to a second voltage; and
  a secondary connector having a first contact, a second contact and a secondary reference contact, said second contact and said secondary reference contact being electrically connected, said first contact making electrical connection with said first detection contact, said second contact making electrical connection with said second detection contact and said secondary reference contact making electrical connection with said reference contact;
  wherein when said second detection contact makes electrical connection with said second contact, said second detection contact is connected to said second voltage.
2. The system of claim 1 wherein:
  said second voltage is ground.
3. The system of claim 1 further comprising:
  a first control circuit for receiving a control signal and a voltage from said first contact, said control circuit performing a logical operation between said control signal and said voltage on said first contact.
4. The system of claim 3 wherein:
  said logical operation is exclusive or.
5. The system of claim 1 further comprising:
  a further secondary connector having a further first contact, a further second contact and a further second- ary reference contact, said further second contact and said further secondary reference contact being electrically connected, said further second contact making electrical connection with said first contact and said further secondary reference contact making electrical connection with said second reference contact;

wherein when said further second contact makes electrical connection with said first contact, said first detection contact is connected to said second voltage.

6. The system of claim 5 wherein:

said second voltage is ground.

7. The system of claim 5 further comprising:

a second control circuit for receiving a control signal and a voltage from said further first contact, said control circuit performing a logical operation between said control signal and said voltage on said further first contact.

8. The system of claim 7 wherein:

said logical operation is exclusive or.

9. An interconnection system comprising:

a primary connector having a first detection contact coupled to a first voltage, a second detection contact coupled to said first voltage and a reference contact coupled to a second voltage;

a secondary connector having a first contact, a second contact and a secondary reference contact, said second contact and said secondary reference contact being electrically connected, said first contact making electrical connection with said first detection contact, said second contact making electrical connection with said second detection contact and said secondary reference contact making electrical connection with said reference contact, wherein when said second detection contact makes electrical connection with said second contact, said second detection contact is connected to said second voltage; and a controller having a first detection port coupled to said first detection contact and a second detection port coupled to said second detection contact, said controller monitoring signals at said first detection contact and said second detection contact to detect a number of secondary connectors mated to said primary connector.

10. The system of claim 9 wherein:

said second voltage is ground.

11. The system of claim 9 further comprising:

a first control circuit for receiving a control signal generated by said controller and a voltage from said first contact, said control circuit performing a logical operation between said control signal and said voltage on said first contact.

12. The system of claim 11 wherein:

said logical operation is exclusive or.

13. The system of claim 9 further comprising:

a further secondary connector having a further first contact, a further second contact and a further secondary reference contact, said further second contact and said further secondary reference contact being electrically connected, said further second contact making electrical connection with said first contact and said further secondary reference contact making electrical connection with said second reference contact;

wherein when said further second contact makes electrical connection with said first contact, said first detection contact is connected to said second voltage.

14. The system of claim 13 wherein:

said second voltage is ground.

15. The system of claim 13 further comprising:

a second control circuit for receiving a control signal generated by said controller and a voltage from said further first contact, said control circuit performing a logical operation between said control signal and said voltage on said further first contact.

16. The system of claim 15 wherein:

said logical operation is exclusive or.

* * * * *